Patented Nov. 13, 1945

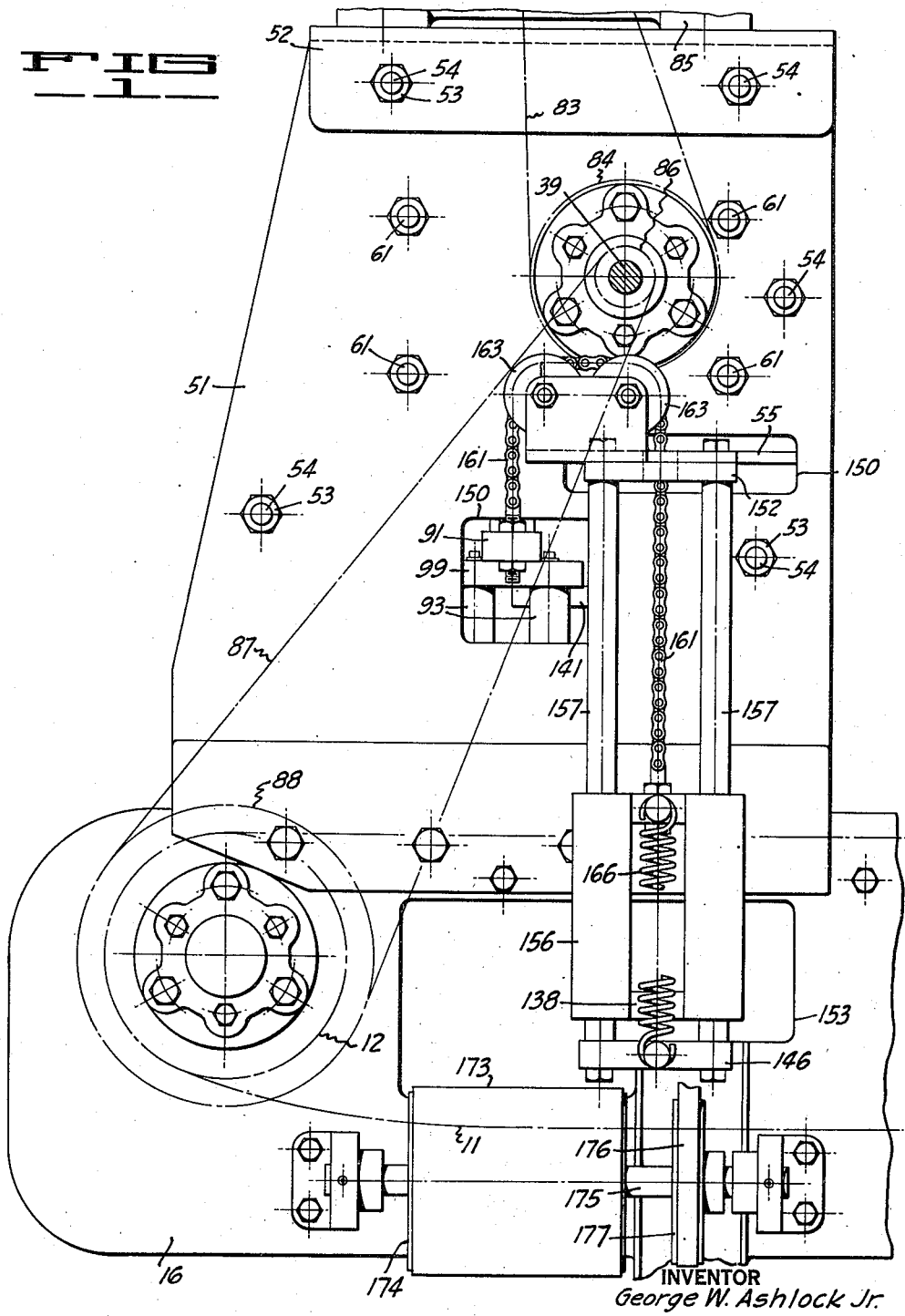

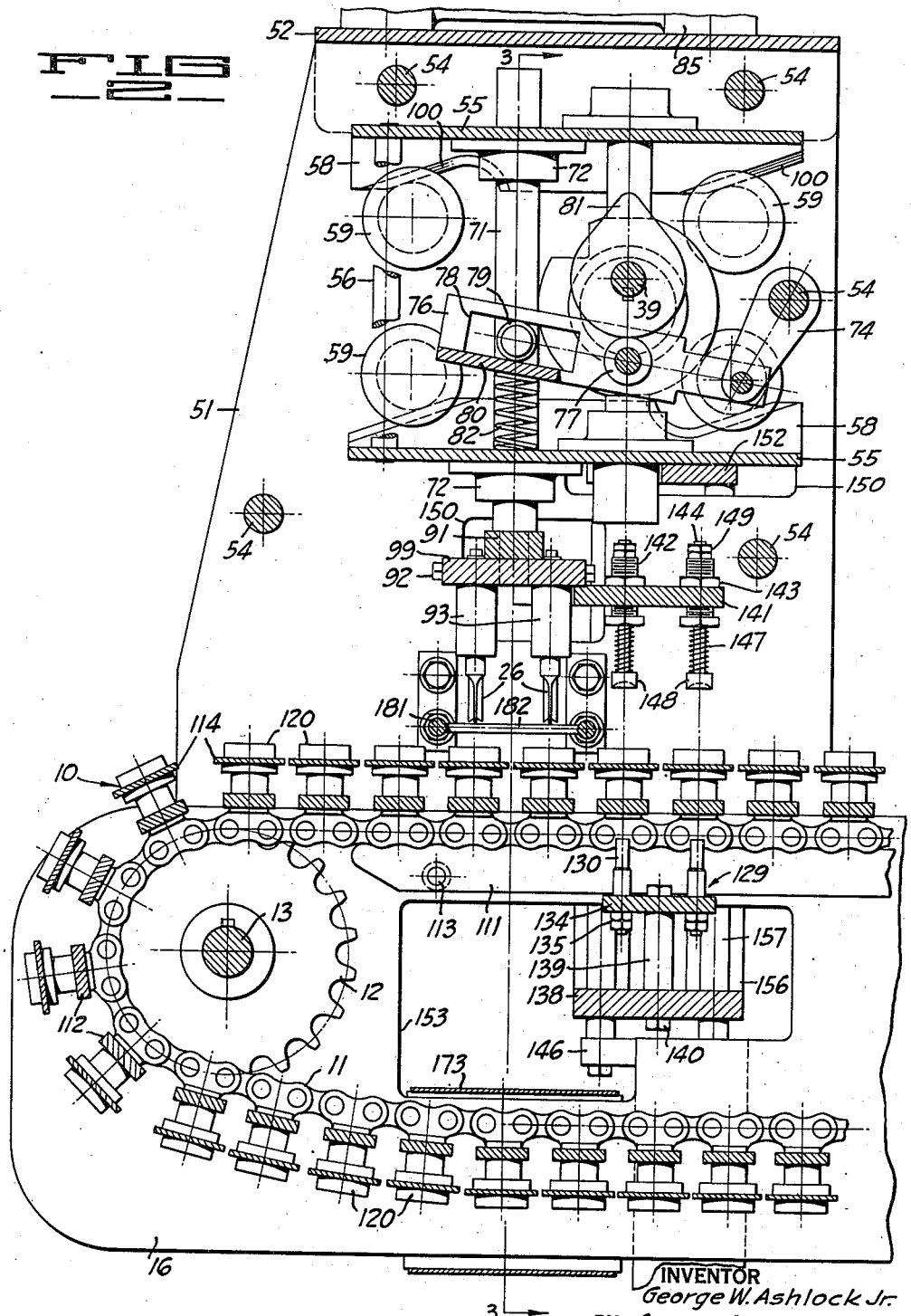

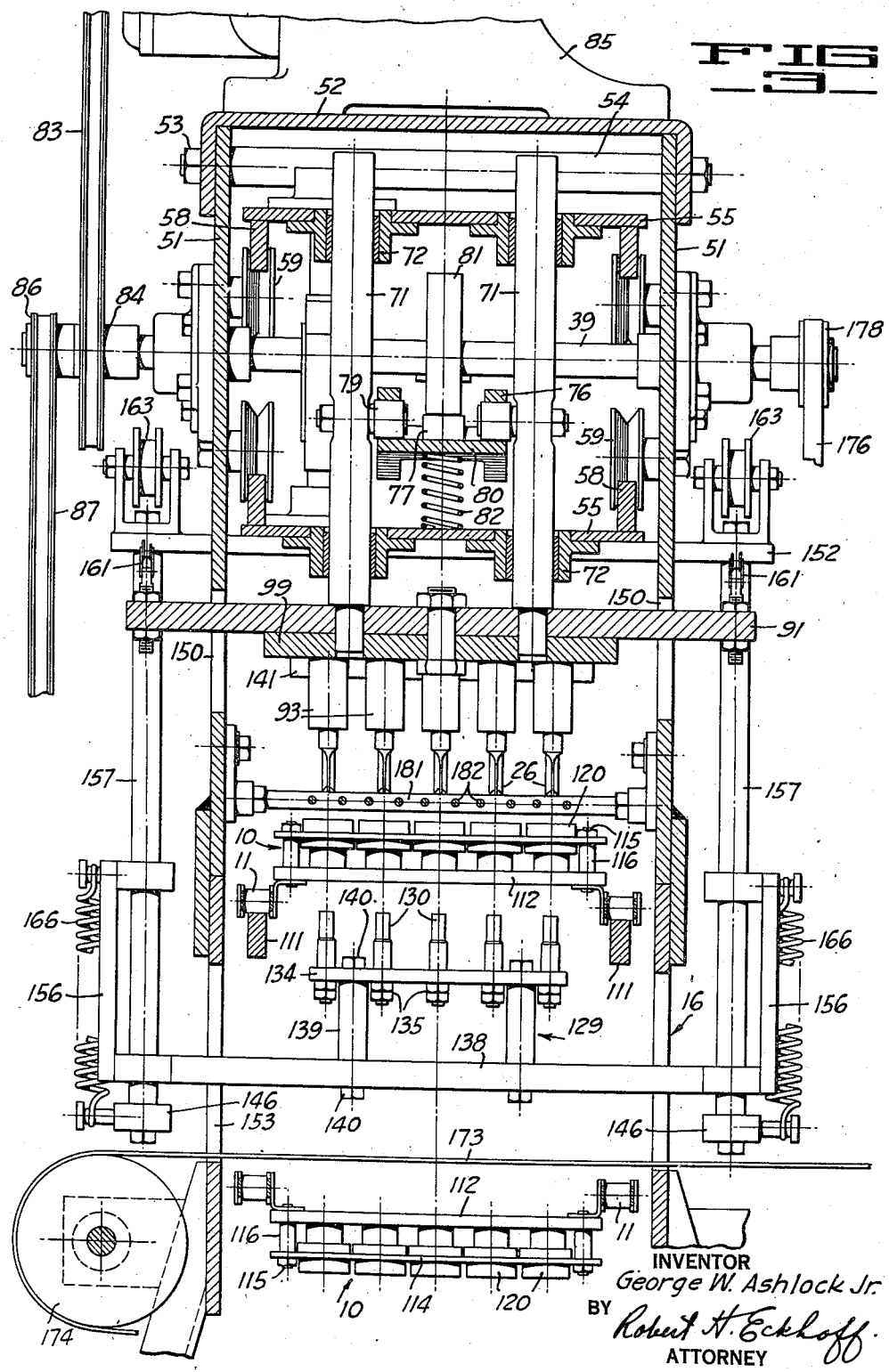

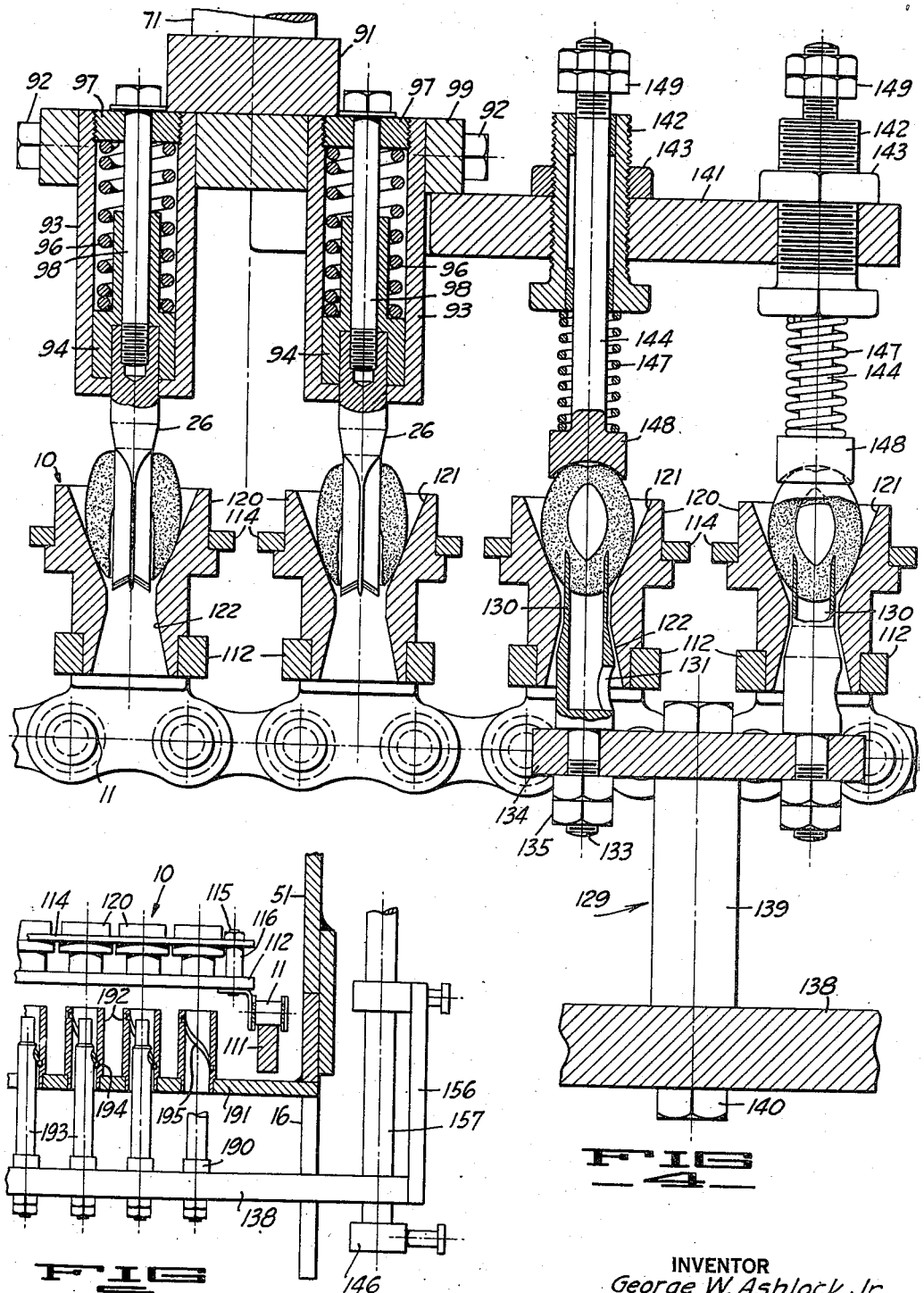

2,388,814

UNITED STATES PATENT OFFICE 2,388,814

PITTING MACHINE

George W. Ashlock, Jr., Oakland, Calif.

Application April 15, 1944, Serial No. 531,213

4 Claims. (Cl. 146—27)

This invention relates to fruit pitting machines and particularly to one adapted to the pitting of drupaceous fruits such as olives, plums, prunes, dates and the like. However, it is not limited in application to these, for it can be successfully employed upon any article having a substantially central stone or pit surrounded by an outer flesh portion. The machine of the present invention has proven particularly useful upon olives and it will therefore be described in this connection. However, it is to be understood that the machine may be employed on other like fruits or articles.

In my Patent 2,271,675 of February 3, 1942, I disclosed a machine for continuously and automatically pitting articles of the class described. This machine has met with widespread commercial success. However, referring to that patent and particularly to Figures 2, 3 and 4 thereof, it will be observed that the stone was removed from the fruit along the longitudinal axis of the fruit in conjunction with a portion of the fruit slightly larger than the stone in cross-section. This was achieved by cutting a core in one side of the fruit with a tubular knife, in axial alignment with the stone, then moving the stone and the attached core into the tubular coring knife which is then withdrawn to remove the stone and core. Inasmuch as the stone was passed through the coring knife without crushing or splintering, it was desirable that the knife be of a size slightly larger than the stone to be removed. Now the usual practice is to grade fruit into different sizes and to then handle a fruit of only one or two sizes on a machine. When it was desired to handle other sizes of fruit, it was necessary to change the coring knives. This requires various sets of knives and their substitution for one another. Also the machine must be inoperative during that period of time while the change is being made. Also, because the core cut in the fruit is of a size at least as large as the stone, a fairly sizable opening is made in one side of the fruit. This cuts away a considerable portion of the edible fruit.

It is in general the broad object of the present invention to provide a pitting machine of the class described which can be successfully applied to various grades of fruit without changing the coring knives.

Another object of the present invention is to provide a pitting machine which can handle simultaneously several sizes of a fruit.

A further object of the present invention is to provide a novel pitting machine.

A still further object of the invention is to provide a pitting machine of the class described wherein a small core is first cut in the fruit and then the stone is ejected. This enables a relatively small core to be cut whereby less of the fruit is cut away and lost. At the same time, a clean cut core is all that is apparent once the pit is ejected and the fruit is not broken nor bruised.

The invention includes other objects and features of advantage, some of which, together with the foregoing, will appear hereinafter wherein the present preferred form of machine embodying this invention is disclosed.

In the drawings accompanying and forming a part hereof,

Figure 1 is a side elevation of the machine while Figure 2 is another side elevation but partly in section to illustrate details of a machine embodying the present invention.

Figure 3 is a section taken along the line 3—3 of Figure 2, and illustrating the machine construction in transverse section.

Figure 4 is an enlarged side elevation, partly in section, showing the relative position at one point in the operation of the pitting knife, the chuck for supporting the fruit and the coring knife.

Figure 5 is a fragmentary view illustrating rotation of the coring knives.

The machine of the present invention includes a conveyor for delivering the fruit to a pitting station. The fruit is generally delivered to the pitting station in a predetermined position and for this the straightening mechanism as shown in my Patent 2,250,518 of July 29, 1941, may be used advantageously. The conveyor construction employed and its relation to the pitting mechanism is generally shown in that patent and in my previously mentioned Patent 2,271,675. The pitting plunger mechanism is shown particularly in my Patent 2,219,832 of October 29, 1940.

Referring to that patent, and particularly to Figures 1 and 2 in the accompanying drawings herein, a carrier structure, generally indicated at 10, is movable past a presently described pitting mechanism. The machine also includes a suitable frame generally indicated at 16; the structure of the frame and of the carrier structure in relation thereto is fully disclosed in the aforementioned patents. The carrier includes a conveyor chain 11 passing over sprockets 12 supported upon shafts 13 suitably journaled in the frame of the machine at each end thereof.

The pitting mechanism employed is that disclosed in my Patent 2,219,832. This includes opposite parallel vertically extending side members 51 supported on frame 16 and joined together by the member 52 and threaded rods 54 extending through each side member 51 and secured thereto by nut 53. Between the side plates is a pitting knife or plunger head structure which includes horizontal parallel plates 55 secured together in a spaced relation by spacers 56. Each plate 55 carries V-block 58 on opposite sides thereof and having angularly formed V-sections 100 on which roll the V-rollers 59. A stud 61 supports each roller on a side member 51. The V-blocks and V-rollers thus support the head structure provided by plates 55 for a reciprocating movement over the plane of the carrier structure 10 and, at the same time, for an up-and-down movement, so that the head structure moves toward and away from the horizontal plane of the carrier structure 10.

Means are provided on the head structure for operating a pitting or plunger mechanism. This includes the plungers 71 suitably journaled in bearings 72 on plates 55. Fixed arms 74 are mounted upon one of the rods 54 and extend to provide a support for the spaced levers 76 between which is mounted a cam follower 77. The extending end of each lever 76 is slotted as at 78 to engage a roller 79 carried upon each plunger 71. The cam follower 77 is maintained in engagement with a cam 81 carried on shaft 39 by a spring 82 pushing on pad 80 joining the levers 76. The spring urges the levers 76 clockwise in Figure 2 so that the cam follower engages the cam at all times. The shaft 39 is driven by a suitable chain 83 passed over a sprocket 84 to a suitable prime mover 85 mounted on member 52. Another sprocket 86 is provided on shaft 39 and a chain 87 is passed over it and about a sprocket 88 on shaft 13.

A plate 91 is mounted upon the extending ends of the plungers 71 and extends transversely across the machine. It carries a plate 99 which supports a plurality of fruit cutting knives or plungers indicated generally at 26. These knives can be arranged in one or more rows across the plate 99 and in the machine illustrated two rows are employed. The construction of the knives is shown in Figure 3. Each knife is provided as a sub-assembly retained in place in the plate by stud 92 which engages cylinder 93. A plunger 94 carries the knife 26 for a reciprocating movement against the bias of spring 96. A plate 97 is screwed into the end of the cylinder to retain the spring in place and to serve as a guide for the stud 98 which extends through plate 97 and is screwed into the knife 26 to retain it in place in the plunger 94. A broken knife is quickly replaced by holding knife 26 and rotating the stud 98 to release the knife.

I have previously mentioned that the fruit carrier structure 10 included spaced conveyor chains 11 passed over sprockets 12 at each end of the frame of the machine. Intermediate these sprockets the upper run of the conveyor provides a horizontal conveyor section, the conveyor chains 11 being supported by suitable tracks or supports 111 provided on each side of the frame, as appears in Figure 2. Each track rail 111 is hinged as at 113 on the side frame of the machine while its other end is supported, as appears in Figures 1, 2 and 3 in my Patent 2,271,675, by a suitable vibrating mechanism. Vibration of the fruit particularly if it is of a fibrous nature, during coring and during removal of the pit, is advantageous I have found. Vibration of the conveyor support is effective to vibrate the fruit.

A plurality of supporting plates 112 are mounted between corresponding links in the conveyor chains. A second plate 114 is retained in a spaced relation with respect to plate 112 by studs 115 and spacers 116. Each of plates 112 and 114 contains suitable apertures to support a plurality of fruit holders generally indicated at 120.

As appears particularly in Figure 4, each fruit holder is preferably formed with a suitable interior configuration enabling the article to be stoned to be positioned in a desired alignment. A suitable configuration is that taught in my Patent 2,250,518 wherein the fruit receiving cavity 121 is formed as an inverted truncated cone with opposite cavity walls substantially at an angle of from 32° to 44°.

A suitable opening 122 in the holder is provided to permit entrance of the coring knife and release of the stone and its associated core as will presently appear.

The coring knife structure comprises a sub-assembly 129 including hollow tubular knife generally indicated at 130 and having a passage 131 adjacent its base to permit the entrance of air so that any solid material in the coring knife can escape readily. Each coring knife has a threaded end 133 extending beyond a plate 134 to which it is secured by lock nuts 135.

A double row of coring knives is mounted on plate 134 which extends across the machine. Plate 134 is supported on another plate 138 which extends across the machine, by spacers 139 and bolts 140.

To retain fruit in alignment during coring, plate 99 which carries the pitting plungers is provided with an extension in the form of a plate 141. This provides a support for threaded barrels 142 which are screwed into the plate 141 and locked in a desired adjustment by nuts 143. The barrels serve as bearings and guides for fruit retainers 144. A spring 147 is placed between the barrel 144 and the concave head 148 on the retainer to mount the retainer resiliently. Lock nuts 149 permit the spring tension to be varied and the retainers to be adjusted in position in the supporting barrel.

The coring knives are moved by the following structure. The machine side frame plates 51 are suitably apertured as at 150 to pass extension plates 152 secured to the lower plate 55 and which extend to the outside of the machine. Frame members 16 are also apertured as at 153 to permit plate 138 and base 146 to be positioned and to extend across the machine. Two rods 157 are secured on each side of the machine to plates 152. At their lower ends these rods are joined to base 146. Plate 138 is removably mounted in a frame 156 which is mounted for sliding on the rods 157. It will be apparent that the coring knives and the ejectors follow the movement of the pitting head plate 55 and move with this plate at the same rate of advance with the conveyor since they are formed as an extension on the pitting head plate 55.

To provide for movement of the coring knives, chains 161 are secured to each side of plates 91 and are then passed over guide pulleys 163 and depend downwardly to the coring knife reciprocating frame 156 which is mounted for a reciprocating movement on the guide rods 157. Springs 166, positioned between frame 156 and the base plate 146 place a tension on the chains 161 and ensure that these remain taut.

The pitting plungers and the coring knives are moved by the pitting head over identical paths except that when the knives are lowered by plungers 71, chains 161 raise the coring knives so the two approach the receptacles but from opposite directions. The coring knives engage and cut fruit in receptacles immediately before they are engaged by the pitting plungers.

Stones and cores ejected by plungers 26 fall onto transverse conveyor belt 173. This is supported by rollers 174 on each side of the machine. One of the rollers is mounted on a shaft 175 on one side of the machine and a V-belt 176 is trained about a pulley 177 on this shaft and a pulley 178 on shaft 39 to move the conveyor.

To strip any meat adhering to the plungers 26, a stripper is provided made up of rods 181 which extend transversely of the machine and carry stripper plates 182 on each side of a knife.

The operation of the machine will become further apparent upon considering the following sequence of operation, particularly in connection with Figure 4.

The description will be made as the machine is operated continuously. However, it is to be understood that it can be operated sequentially if desired, that is, instead of moving the pitting, coring mechanisms and the conveyor structure 10 continuously, the conveyor structure 10 can be moved to a pitting and coring position and brought to rest, the stoning, coring and pit-removing mechanisms operated, whereupon the conveyor mechanism is advanced. However, this sequential operation is not nearly so fast and continuous operation is usually greatly preferred.

It being understood that shaft 39 is being rotated at a suitable speed, and that conveyor 10 is being operated in a timed relationship therewith, and that each receptacle 120 contains fruit in alignment, the fruit is advanced to the fruit pitting and coring station as appears in Figure 2.

As the fruit advances, the pitting plungers are lowered to engage and force out the pits through the previously cut cores. At the same time, the coring knives are raised to engage and cut fruit in the receptacles just ahead of the pitting plungers. As the pitting plungers are lowered to engage fruit, the retainers 144 also drop to hold fruit for cutting by the coring knives. The retainers 144 are independent of each other so it is immaterial whether the fruit be of a uniform size grade. As a matter of fact, the machine is capable of handling at one time all commercially packed sizes.

In some cases it is desirable to rotate the coring knives, and in Figure 5 I have shown a mechanism for effecting this. The coring knives are rotatably mounted in plate 138 as at 190. A fixed plate 191 extends across the machine and supports a plurality of sleeves 192, one over the body 193 of each knife and fitting the body closely so that a pin 194 on the knife rides in a spiral slot 195 in the sleeve as the knife is reciprocated. In this way the knife is oscillated. If desired, the cutting edge on the knife can be serrated to facilitate cutting of the fruit.

From the foregoing I believe it will be apparent that I have provided a machine which in a rapid and continuous manner enables a fruit to be pitted with a minimum flesh removal. In practice I am able to increase by a material extent the quantity of fruit which is secured from the pitting operation. In other words, if one took two like masses of fruit and pitted one mass of the same weight on my previous pitting machine, and pitting an equal mass on the machine of the present invention, the latter mass will exceed the weight of the former mass by several percent, indicating the greater retention in the quantity of the fruit as a result of the pitting operation conducted in accordance with this invention. This should be apparent readily for the size of the core cut is independent of the fruit size for retainers 144 are adjusted to hold without bruising any size of fruit. The cut core facilitates subsequent pit ejection, the pitting plungers exerting but little force on the fruit.

I claim:

1. In a machine of the character described, a conveyor movable continuously over a path including a fruit coring station and adjacent thereto and spaced therefrom, along the path of advance of said conveyor, a fruit pitting station, said conveyor including a plurality of fruit holding receptacles each having a fruit holding portion tapering inwardly to an opening through each receptacle, a coring knife movable upwardly at said coring station through the opening in each receptacle to cut a core in a fruit in said receptacle to the pit therein, a retainer movable downwardly at said coring station to retain fruit in said receptacle during coring, a pitting plunger movable downwardly at said pitting station to eject said pit and said core, a plunger head structure carrying said knife, said plunger and said retainer, and means for moving said head (a) to lower said plunger and retainer to engage fruit in adjacent receptacles at said stations and to advance simultaneously with said conveyor and (b) to raise said coring knife simultaneously to engage and core fruit held in place in one of said receptacles by said retainer.

2. In a machine of the character described, a conveyor movable continuously over a path including a fruit coring station and adjacent thereto and spaced therefrom along the path of advance of said conveyor, a fruit pitting station, said conveyor including a plurality of fruit holding receptacles each having a fruit holding portion tapering inwardly to an opening through each receptacle, a coring knife movable upwardly at said coring station through the opening in each receptacle to cut a core in a fruit in said receptacle to the pit therein, a retainer movable downwardly at said coring station to retain fruit in said receptacle during coring, means for rotating said coring knife during its core cutting engagement with the fruit, a retainer movable downwardly at said coring station to retain fruit in said receptacle during coring, a pitting plunger movable downwardly at said pitting station to eject said pit and said core, a plunger head structure carrying said knife, said plunger and said retainer, and means for moving said head (a) to lower said plunger and retainer to engage fruit in receptacles at said stations and to advance simultaneously with said conveyor and (b) to raise said coring knife simultaneously to engage and core fruit held in place by said retainer.

3. In a machine of the character described, a conveyor movable continuously over a path including a fruit coring station and adjacent thereto and spaced therefrom, along the path of advance of said conveyor, a fruit pitting station, said conveyor including a plurality of fruit holding receptacles each having a fruit holding portion tapering inwardly to an opening through each receptacle, a coring knife movable upwardly at said coring station through the opening in each receptacle to cut a core in a fruit in said receptacle to the pit therein, a retainer movable downwardly at said coring station to retain fruit in said receptacle during coring, means operative during the raising of said coring knife for rotating said coring knife during its core cutting engagement with the fruit, a retainer movable downwardly at said coring station to retain fruit in said receptacle during coring, a pitting plunger movable downwardly at said pitting station to eject said pit and said core, a plunger head structure carrying said knife, said plunger and said retainer and means for moving said head (a) to lower said plunger and retainer to engage fruit receptacles at said stations and to advance simultaneously with said conveyor and (b) to raise said coring knife simultaneously to engage and core fruit held in place by said retainer.

4. In a machine of the character described, a conveyor movable continuously over a path including a fruit coring station and adjacent thereto and spaced therefrom, along the path of advance of said conveyor, a fruit pitting station, said conveyor including a plurality of fruit holding receptacles each having a fruit holding portion tapering inwardly to an opening through each receptacle, a coring knife movable upwardly at said coring station through the opening in each receptacle to cut a core in a fruit in said receptacle to the pit therein, a retainer movable downwardly at said coring station to retain fruit in said receptacle during coring, a pitting plunger movable downwardly at said pitting station to eject said pit and said core, a plunger head structure carrying said knife, said plunger, said retainer and said coring means, means for reciprocating said plunger head structure back and forth over said conveyor, forward reciprocating movement of the plunger head being at substantially the same rate as the rate of continuous advance of the conveyor, and means operable during forward movement of said plunger head structure for simultaneously moving said plunger and said retainer downwardly and said coring means upwardly with respect to said head to lower said plunger to eject a pit from a fruit at the pitting station and to retain fruit in position for coring by the coring knife at the coring station.

GEORGE W. ASHLOCK, Jr.